Feb. 3, 1931. O. ERICKSON 1,791,266
RAKE
Original Filed Oct. 25, 1924
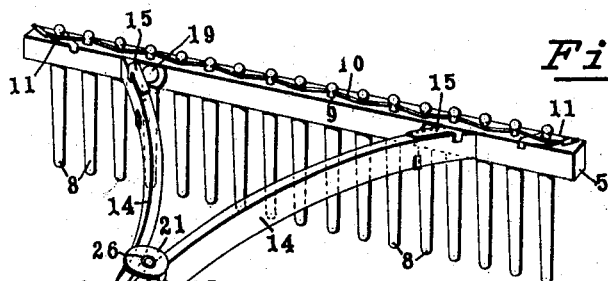
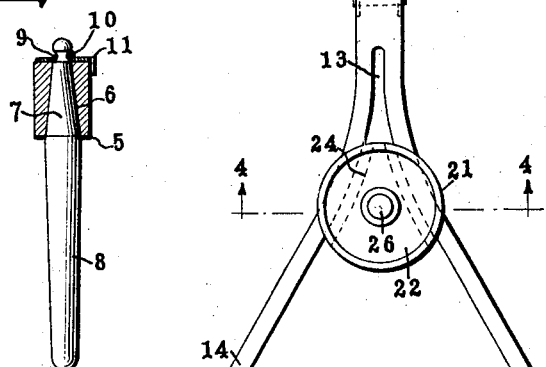
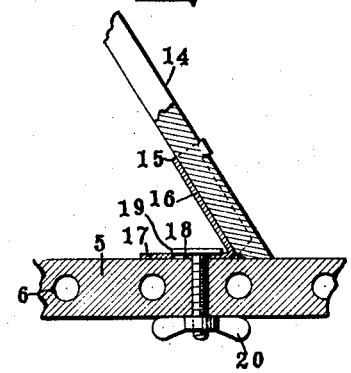
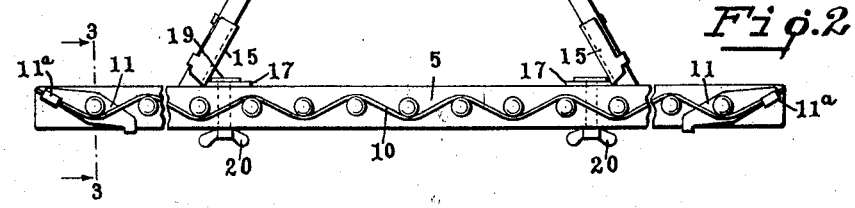
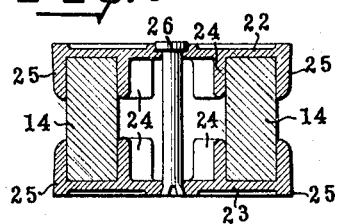
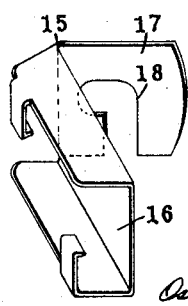
INVENTOR
Oscar Erickson
BY
Mayer, Warfield & Watson
ATTORNEY Patented Feb. 3, 1931

1,791,266

UNITED STATES PATENT OFFICE

OSCAR ERICKSON, OF QUINCY, MASSACHUSETTS, ASSIGNOR TO WILLIAM W. FRASER, TRUSTEE, OF NEW YORK, N. Y.

RAKE

Application filed October 25, 1924, Serial No. 745,746. Renewed June 11, 1930.

This invention relates to rakes, and more particularly to rakes adapted to be disassembled or "knocked down" when not in use.

The object of this invention generally is to provide an improved rake which is economical, efficient and readily manufactured.

More specifically an object of this invention is to provide a rake which may be assembled and disassembled with facility, the parts being readily replaceable, and when assembled is rigid and durable.

Other objects of the invention will be in part obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Figure 1 is a perspective view of a rake embodying this invention;

Fig. 2 shows, in plan view, the head and handle of the rake being in assembled relation;

Fig. 3 shows a detail in the fastening means for the teeth taken on line 3—3 of Fig. 2;

Fig. 4 is a fragmentary view, partly in section, showing a detail in the fastening means for the handle;

Fig. 5 shows in perspective, the fastening clip shown in Fig. 4; and

Fig. 6 is a sectional view, taken on line 4—4 of Fig. 2 and shows details in the spreader for the fork of the handle.

Referring now to the drawing, 5 denotes a bar or beam comprising the rake head and is provided with a series of slightly tapered vertical apertures 6 (see Figs. 3 and 4) adapted to receive the corresponding upper tapered portions 7 of the teeth 8. These upper tapered portions of the teeth extend through and above the top of the head 5 and are each provided with an annular groove 9, so positioned thereon that the guard member 10 will ride snugly on the top of the head 5 and engage with the groove 9. The grooves 9 for the set of teeth shown in Fig. 1 are thus in horizontal alignment when the teeth are properly fitted into their respective apertures.

The guard member 10 is here shown as a resilient rod or piece of metal which is preferably woven sinuously back and forth among the projecting upper ends of teeth 8 so as to engage alternately with the front and rear portions of the grooves of successive teeth. A piece of spring brass wire is a suitable resilient member for this service, and when in place serves as a locking means adapted to hold the teeth in place, but when removed permits the teeth to be disassembled quickly from the head.

Over the projecting top of the tooth at each end of the head 5 is slipped a retaining clip 11, which has an overturned lug 11$^a$ to provide a retaining groove for the ends of the guard member 10.

The handle is shown at 12 and is preferably made of resilient and tough wood. This handle, as shown, has a fork, and accordingly is split at 13 to provide a pair of arms 14 which are bent apart and provided each with bayonet clips or brackets 15 with which to secure the handle to the head.

The bayonet clips or brackets 15, as shown, particularly in Figs. 4 and 5, comprise angular pieces preferably of metal having a portion 16 engaging with an arm 14, and another shown at 17, extending at an angle to the first and adapted to be flat along the side of the head 5. These portions 17, as shown in Fig. 4, each have an open slot 18, which is illustrated clearly in Fig. 5. This slot is adapted to engage detachably in bayonet fashion with the head of the bolt 19 secured in the head 5, and drawn tightly into place by means of the wing nut 20.

It is generally preferable in this form of rake, though by no means essential, to provide means for maintaining the fork of the handle with the proper set. This means is conveniently termed a "spreader" and is shown at 21, in Fig. 2, inserted well up in the crotch of the fork. This "spreader" comprises upper and lower clamping plates 22 and 23 (see Fig. 6) each having inside and outside lugs 24 and 25 which engage respectively with the sides of the arms 14 of the fork. A single rivet 26, is shown as holding the clamping plates in place.

The rake, thus constructed, is well adapted to be assembled and disassembled quickly and expeditiously and is hence adapted to be stored, shipped or transported from one place of use to another in a knock down condition. In case a tooth becomes broken or otherwise rendered useless, such tooth may be quickly replaced by another and the service of the rake be thus unimpaired.

The fork of the handle, provides support for the head at two widely separated points which are at the same time integral with the handle. Mechanically this is a triangle which rigidly supports the head from the handle; yet it will be seen that owing to the resilience of the arms 14, they at the same time yieldingly support the head upon the handle and thereby permit the handle to bend from side to side through a limited arc, without danger of breaking or displacing the parts.

When assembling the rake the clip 11, as clearly seen in Fig. 3, is slipped on over the projecting head of a tooth before the guard member 10 is put in place. As a consequence the clip 11 is itself held in place under the guard member when this member engages with the grooves 9. By protecting and retaining the ends of the guard member in place by means of clips 11, accidental displacements of the guard member from the head of the rake is avoided.

This case is a continuation in part of my application, Serial No. 598,904, filed November 3, 1922.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. As an article of manufacture, a rake comprising a head having a plurality of teeth lying in the same general plane, a handle of resilient material bifurcated at one end to provide integral arms, and means for attaching said arms to said head; said arms being arranged so that the plane of said teeth is substantially perpendicular to said handle, each of said arms having a permanent set extending toward the other whereby the plane of said head may move yieldingly with respect to said handle.

2. As an article of manufacture, a rake comprising a head having a plurality of teeth lying in the same general plane, a handle of resilient material bifurcated at one end to provide integral arms, said arms being spread and bent outwardly providing a set in each arm extending toward the other, means for attaching said arms to said head, and means on said arms for maintaining said set.

In testimony whereof I affix my signature.

OSCAR ERICKSON.